O. F. STIFEL.
HEADLIGHT.
APPLICATION FILED DEC. 9, 1912.
1,070,199.
Patented Aug. 12, 1913.
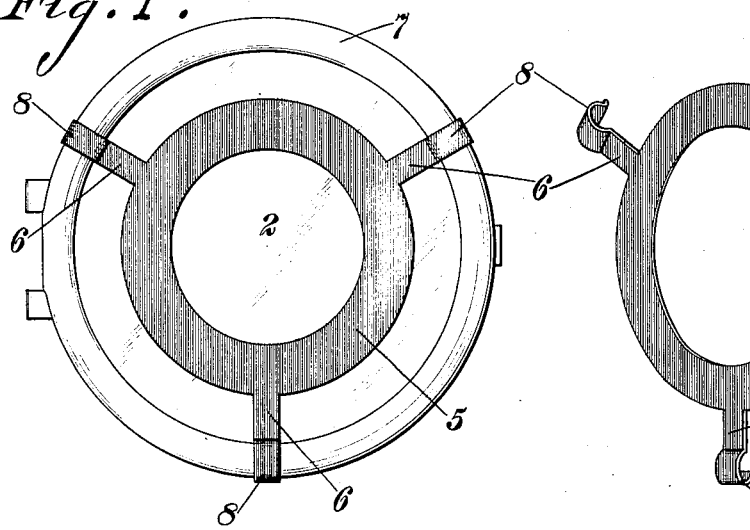
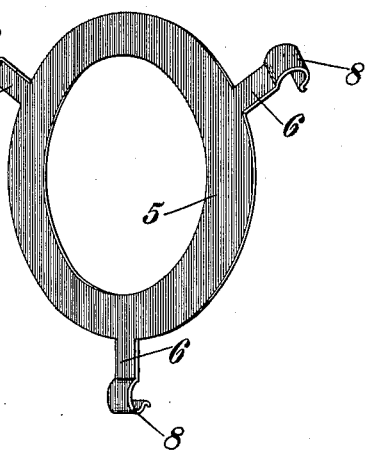

UNITED STATES PATENT OFFICE.

OTTO F. STIFEL, OF ST. LOUIS, MISSOURI.

HEADLIGHT.

1,070,199. Specification of Letters Patent. Patented Aug. 12, 1913.

Application filed December 9, 1912. Serial No. 735,665.

*To all whom it may concern:*

Be it known that I, OTTO F. STIFEL, a citizen of the United States, residing at the city of St. Louis and State of Missouri, have invented certain new and useful Improvements in Headlights, of which the following is a specification.

In some places laws have been passed prohibiting the burning of headlights on motor vehicles within certain limits, on account of the glaring light which such lamps throw, and which not only hinders traffic, especially in cities, but is often the cause of accidents and fatalities, because of its blinding effect upon pedestrians, chauffeurs, motormen, drivers, and others. On country roads when two motor vehicles are running toward each other in the dark with their headlights burning, the glaring light from the headlight of the approaching machine shines into the face of the chauffeur of the other machine with such a blinding effect that it is impossible for the chauffeurs to distinguish what is in front of their machines until the latter have nearly passed each other, an accident or a fatality sometimes resulting from one machine running into the side of the other or from one machine or both striking someone or something or plunging over the side of a bridge or an embankment. To run a motor vehicle at night with only its side lamps burning is also dangerous to the public, because of the difficulty of distinguishing same from a relatively slow-moving cab, carriage, or other animal-drawn vehicle which usually carries only side lamps. It is a great advantage to the public for automobiles to burn their headlights at all times, because they can be seen at so much greater distance than the mere carriage or side lights can be, and this enables a pedestrian or the driver of a slow-moving vehicle to determine whether he will wait for the motor vehicle to pass or to hurry across before it.

It is the object of the present invention to obviate the above-mentioned objectionable features by providing a light obstructer for headlights of motor vehicles and the like, which will obstruct or diffract some of the rays, so as to diminish the glare sufficiently to destroy the blinding effect which the light from such lamps usually produces.

To this end, the present invention consists of the provision of a light obstructer for headlights of motor vehicles and the like, which will permit the headlights to be burned at night without producing a blinding effect upon pedestrians, chauffeurs, motormen, drivers, and others, thereby enabling pedestrians and other persons to distinguish a motor vehicle from a cab, carriage, or other animal-drawn vehicle, and also enabling chauffeurs to distinguish what is in front of their cars, thus lessening the chances of accidents and fatalities.

Further, the present invention consists of the novel features of construction and arrangement of parts hereinafter more fully described and pointed out in the claim.

In the accompanying drawings forming part of this specification, in which like numbers of reference denote like parts wherever they occur, Figure 1 is a front elevation of a headlight with the invention applied thereto; and Fig. 2 is a perspective view of the light obstructer detached from the headlight.

The invention consists of a substantially ring-like one-piece light obstructer 5 located substantially concentric to the face of the lens 2 which obstructer has its inner circumference spaced from the center of the lens and its periphery spaced from the periphery of the lens. The obstructer is of solid imperforate and continuous construction enabling same to be easily stamped out from a section of sheet metal, or the like. A series of spaced radial arms 6 extend from the periphery of the obstructer in the same plane therewith and contact with the outer face of the lens, the free end portions of said arms being formed with hook-shaped spring fingers 8 that are for engagement over the periphery of the lens supporting frame 7. The arms extend from the periphery of the obstructer to points at the inner circumference of the lens supporting frame 7.

From the above it will be readily apparent that the obstructer may be easily and quickly placed in position, and removed and since the arms and the obstructer contact with the face of the lens, the parts will be braced and held, by the spring fingers, against movement.

It will be evident that when a headlight or the like is equipped with a light obstructer or diffracter as hereinabove described, the latter will obstruct or diffract some of the rays with the result that the light emitted from the headlight will be softer and dimmer than usual, and the glare and blinding effect of the light will be eliminated.

It should be understood that the light obstructer or diffracter may be used on automobiles, and other motor vehicles, streetcars, and locomotive engines, and the like.

I claim:

In combination with the lens of a headlight, a substantially ring-like one-piece light obstructer located substantially concentric to the face of the lens and having its inner circumference spaced from the center of the lens and its periphery spaced from the periphery of the lens, said obstructer from its inner circumference to its periphery being of solid imperforate and continuous construction, and a series of spaced radial arms extending from the periphery of the obstructer in the same plane with the latter to contact with the outer face of the lens, the free end portions of said arms being formed with hook-shaped spring-fingers which are for engagement over the periphery of the lens supporting frame, said arms contacting with the front face of the lens from points at the periphery of the obstructer to points at the inner circumference of said supporting frame of the lens.

In testimony whereof I hereunto affix my signature in the presence of two witnesses.

OTTO F. STIFEL.

Witnesses:
 GEORGE G. ANDERSON,
 WALTER C. GUELS.